United States Patent [19]

Dalle

[11] 4,330,580
[45] May 18, 1982

[54] PROCESS FOR MANUFACTURE OF WALL COVERINGS AND WALL COVERINGS THUS OBTAINED

[75] Inventor: Joël Dalle, Bondues, France

[73] Assignee: Dalle & Cie, S.A., Wervicq, France

[21] Appl. No.: 255,891

[22] Filed: Apr. 20, 1981

Related U.S. Application Data

[62] Division of Ser. No. 8,581, Feb. 1, 1979, Pat. No. 4,297,156.

[51] Int. Cl.³ .......................... B32B 7/06; B32B 7/08
[52] U.S. Cl. .................................... 428/43; 428/102; 428/193; 428/222; 428/229; 428/238; 428/292; 428/293; 428/294; 428/295
[58] Field of Search ................ 428/102, 43, 193, 194, 428/103, 104, 292, 293, 294, 295, 229, 222, 238; 225/1, 2, 3; 156/93, 267, 148, 248, 247, 253, 290, 306.6, 313; 112/122, 123 R, 127, 130, 153, 440, 441, 438, 412, 402

[56] References Cited

U.S. PATENT DOCUMENTS

| | | | |
|---|---|---|---|
| 1,174,069 | 3/1916 | Hosford | 428/43 |
| 1,963,393 | 6/1934 | Woodall | 156/93 |
| 2,274,851 | 3/1942 | Schneider | 428/236 |
| 2,333,630 | 11/1943 | Anidon | 66/192 |
| 2,424,777 | 7/1947 | Stuart | 428/102 |
| 2,458,500 | 1/1949 | Bertrand et al. | 428/102 |
| 2,726,977 | 12/1955 | See et al. | 428/238 |
| 2,905,176 | 9/1959 | Davidson | 156/93 |
| 3,160,548 | 12/1964 | Gillick, Jr. et al. | 428/287 |
| 3,274,805 | 9/1966 | Duhl | 66/192 |
| 3,315,676 | 4/1967 | Cooper | 428/43 |
| 3,323,976 | 6/1967 | Salces | 428/43 |
| 3,420,731 | 1/1969 | Kuhn | 428/104 |
| 3,619,336 | 1/1971 | Hughes | 428/102 |
| 3,635,786 | 1/1972 | Hughes | 66/192 |
| 3,841,954 | 10/1974 | Lauder | 428/102 |
| 4,010,300 | 3/1977 | Wallin | 428/104 |
| 4,090,902 | 5/1978 | Ferrentino et al. | 156/267 |
| 4,130,679 | 12/1978 | Breznak et al. | 428/102 |

FOREIGN PATENT DOCUMENTS 47596  4/1888  Fed. Rep. of Germany .

Primary Examiner—Stanley S. Silverman
Attorney, Agent, or Firm—Kerkam, Stowell, Kondracki & Clarke

[57] ABSTRACT

A wall covering has a textile element secured to a backing by a thermo-fusible material. The textile element is formed of compacted zig-zags of the warp formed by a crocheting machine and held on the backing by chain stitching parallel to the direction of movement in the machine. The chain stitching along the selvage edges of the element precut the backing for removal of excess backing by tearing. The covering is coupled by a final step of fusing the thermo-fusible material.

1 Claim, 3 Drawing Figures

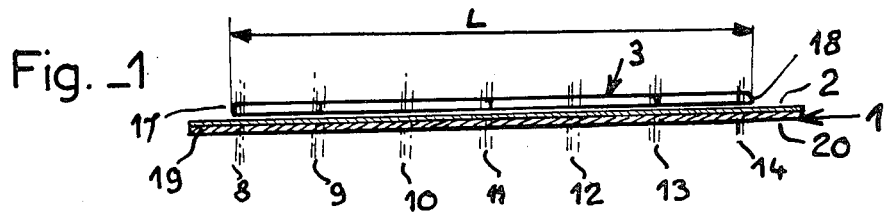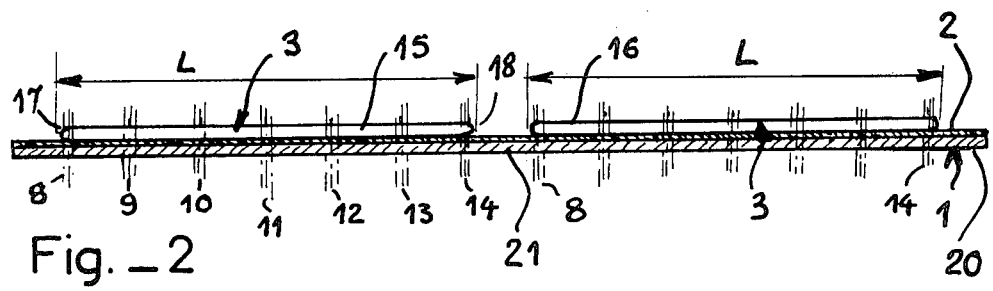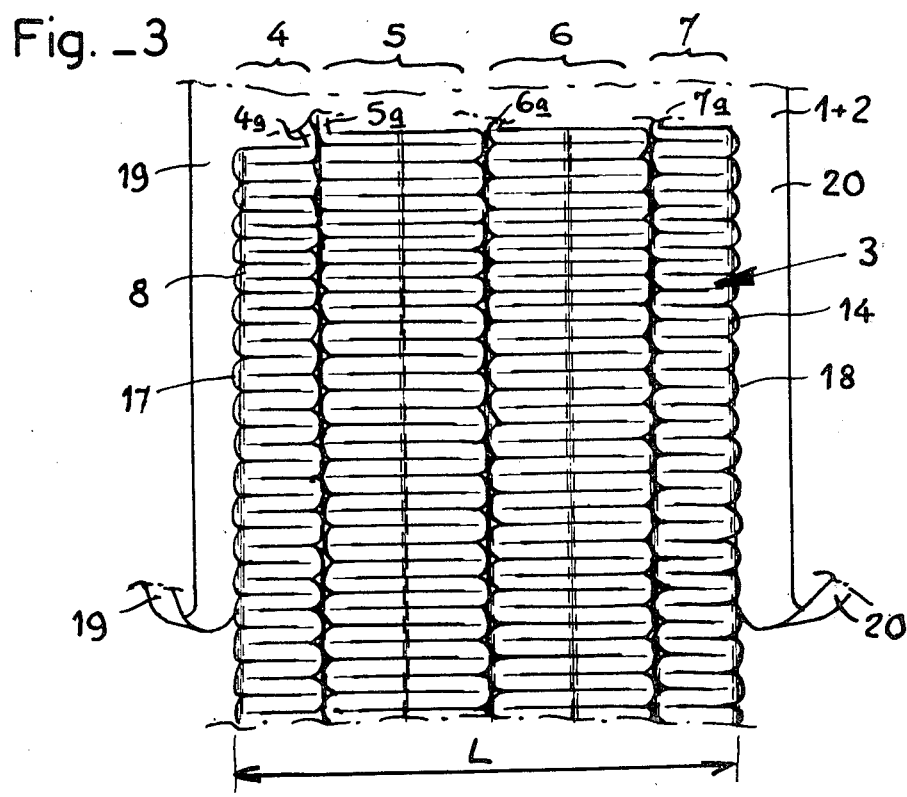

PROCESS FOR MANUFACTURE OF WALL COVERINGS AND WALL COVERINGS THUS OBTAINED

This application is a division of application Ser. No. 008,581, filed Feb. 1, 1979, now U.S. Pat. No. 4,297,156.

BACKGROUND OF THE INVENTION

The invention relates to a process for manufacture of a complex providing a wall covering. It also relates to the wall covering thus obtained and more particularly to such a covering composed of an element, a nap of natural textile associated with a support sheet indeformable dimensionally, such as a paper, to provide dimensionable stability to the nap and to facilitate it adherence on a wall without the appearance of portions of the adhesive.

To obtain such a complex, it is known, first of all, to provide the textile element.

To do this, either fibers are associated with a support sheet or, more frequently, there is disposed transversely to the direction of advance of the work, that is in warp, threads or meshes maintained substantially parallel and side by side by longitudinal stitches, parallel to the direction of advance of the work, that is in chain, and this more particularly but not exclusively by means of a crocheting machine.

This textile element is then, in the second phase, disposed on its support which is indeformable dimensionally, generally of paper, to which it is adhered for example by heating of a film of thermally fusible plastic material.

The complex thus obtained is then split longitudinally to the desired width to form bands with selvages which are perfectly parallel.

This working to measure cannot be operated exactly because the textile element taken alone is not dimensionally stable even if it comprises a sheet by reason of the fact that it was made in accordance with this first process.

It is then manufactured in excessive width and recut only after being fixed to its support.

Such a fabrication process has numerous inconveniences. Primarily, with respect to the machine for manufacturing of the textile element and the adherence to the support, a machine is required for the deposit of the textile element on the strong support and including cutting apparatus for cutting to the desired width with supplementary handlings that this requires and the resulting cost is must increased.

Further, during the disposition of the still deformable textile element on its future support, the said element expands more or less with resulting defects in parallelism of the threads or meshes of the warp causing the joints to stand out after adherence of the several bands.

Further, by reason of the width cut, especially when the warp is formed of large meshes which may even be twisted, the adherence to the support is not sufficient to maintain the extremities of the meshes which bristle and equally accent the joint between the bands.

The result that the present invention obtains is a process of manufacture which requires no other machine and/or handling than that utilized during manufacture of the textile element and it assures its adherence on the strong support with resulting reduction in price of obtaining the complex thus manufactured.

Another result of the invention is that such a process does not require recutting of the textile element while providing a band having selvages which are perfectly parallel.

It is also a result of the invention that such a process provides a textile element which cannot be deformed and the threads of the warp cannot be displaced even before adherence to the strong support.

Further, the process of the invention results in the extremities of the warp being perfectly maintained on the support even in the case of large meshes without opportunity for the warps to bristle.

SUMMARY OF THE INVENTION

To these ends, the invention has for its object a process of the type described above characterized in that by utilizing a machine placing the warps in zig-zag and securing them by chain stitches, such as a crocheting machine, the textile element is made in at least one width at a time, each exclusively equal to the width of the final covering; by providing chain stitches along each selvage through the indeformable support and its adhesive product, the support being a band of greater width than that of the textile element; by feeding the textile element to the fabricating machine to be fixed to the support directly by the chain stitches securing the warp and thus preventing after positioning of the warp all deformation of the complex; and when leaving the machine the final covering requires nothing further than the tearing off of the surplus support which is facilitated by the perforations therein by the chain stitches of the selvages and passage through a source of heat for thermal adherence of the textile element to the support.

BRIEF DESCRIPTION OF THE DRAWINGS

The invention will be better understood from the following description of the preferred embodiment by way of non-limiting example with respect to the accompanying drawings which show schematically in FIG. 1 a cross-sectional view of the complex;

FIG. 2 shows a variation of the structure of this complex; and

FIG. 3 is a front view of the complex.

DESCRIPTION OF THE PREFERRED EMBODIMENT

The complex providing the wall covering in accordance with the invention comprises, in known manner, a support 1 indeformable in dimensions, such as a paper, on which is placed an adhesive product 2 such as a layer of thermally fusible plastic material and then a nap 3 constituting the textile element of the covering.

This textile element is made using equipment such as a crocheting machine for the placing of at least one band 4, 5, 6, 7 of threads or meshes forming very compact zig-zags such that the bends 4A, 5A, 6A, 7A of the warp will be side by side and perpendicular to the direction of advance of the work, these elements of the warp being fixed in this position by stitching 8, 9, 10, 11, 12, 13 and 14, parallel to the direction of advance of the work and from this fact with chain threads; such equipment generally making at the same time several widths 15, 16, of such a textile element.

In accordance with an essential characteristic of the invention, on the one hand, the textile element is made in at least one width by each exclusively of the width "L" of the final covering while providing chain stitches 8 and 14 on the warp along the lengths of each selvage 17, 18 and, on the other hand, there is furnished to the machine making this textile element the indeformable support in a band of greater width than that of the textile element and this support is fixed to the textile element directly by the parallel stitches in the direction of advance of the work.

In the preferred embodiment, each width is made up of several bands 4, 5, 6, 7 to present, after the positioning of several widths, joints of bands of warp other than those between two successive widths to as not to mark the implacement of these last joints.

In leaving the machine forming the textile element, which is then already associated with its indeformable support, it is sufficient to tear away the surplus parts of the support which form the borders 19, 20 and also possibly the intermediate parts 21. This tearing presents no difficulties, the perforations resulting from the stitchings 8 and 14 in the selvage having provided a precut just under this selvage. A cutting tool is therefore not necessary. This tearing however can be performed mechanically as for example by means of grippers and/or a drum rolling up the borders.

The complex thus obtained can go directly to the gluing location, for example, utilizing a heating roll for the film 2 of thermo-fusible material.

The fusion of the film with its gluing action also provides closing of the perforations in the support resulting from the stitches and there is then no risk of the appearance of spots or stains by penetration of the adhesive necessary to the positioning of the widths on the wall.

The invention relates also to a covering thus obtained notably remarkable in that on the selvages, the warp of the textile element is maintained by chain stitches and is not cut.

In the above description, it has been stated that the crocheting machine deposits the threads or meshes in very compact zig-zag but, obviously, this only by way of an example which does not exclude the possibility of providing designs, all the usual application of threads or meshes by the machine being possible without departing from the present inventive concept.

What I claim is:

1. A wall covering composed of an element of a textile nature associated with a support of dimensionally indeformable material on which support the textile element is fixed by the fusion of a film of thermoplastic material interposed between the textile element and the support, the textile element being formed by crocheting with deposit of at least one warp band of threads or meshes in a zigzag having the portion of the warp substantially perpendicular to the direction of advance of the work prefixed in this position by chain stitching parallel to the direction of advance of the work, the textile element being of the exact width of the final covering and stabilized in width and straightness by the support of width greater than that of the textile element, the textile element being prefixed to the support and film by the chain stitching that positions the portions of the warp, chain stitching along each edge of the warp to prevent the marginal portions of the warp from displacing before being fixed by fusion of the film and providing a line of precutting of the support and of its film to facilitate the ultimate tearing away of the excessive width of the support, and the fused film positively fixing the textile element on the support.

* * * * *